United States Patent
Okubo

(10) Patent No.: US 6,370,331 B1
(45) Date of Patent: Apr. 9, 2002

(54) PHOTOMETRY/DISTANCE MEASURING UNIT

(75) Inventor: Mitsumasa Okubo, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/580,645

(22) Filed: May 30, 2000

(30) Foreign Application Priority Data

Jun. 4, 1999 (JP) .......................................... 11-157881

(51) Int. Cl.[7] .............................. G03B 7/08; G03B 13/36
(52) U.S. Cl. ........................ 396/56; 396/106; 396/120; 396/233; 396/268
(58) Field of Search ................................ 396/106, 120, 396/111, 56, 233, 234

(56) References Cited

U.S. PATENT DOCUMENTS 5,461,451 A * 10/1995 Seki et al. .................. 396/106

FOREIGN PATENT DOCUMENTS

JP    6-18930    3/1994   .......... G03B/13/36

* cited by examiner

Primary Examiner—W. B. Perkey
(74) Attorney, Agent, or Firm—Frishauf, Holtz, Goodman, Langer & Chick, P.C.

(57) ABSTRACT

A compact and high-performance photometry/distance measuring unit in which a chip can be used in common optimally, and the characteristics of the devices can be optimized. The photometry/distance measuring unit comprises a distance measuring PSD, a spot sensor and an average metering sensor. The spot sensor, the average metering sensor, a photometry circuit and a distance measuring circuit are formed on an IC chip independent of the PSD.

20 Claims, 8 Drawing Sheets

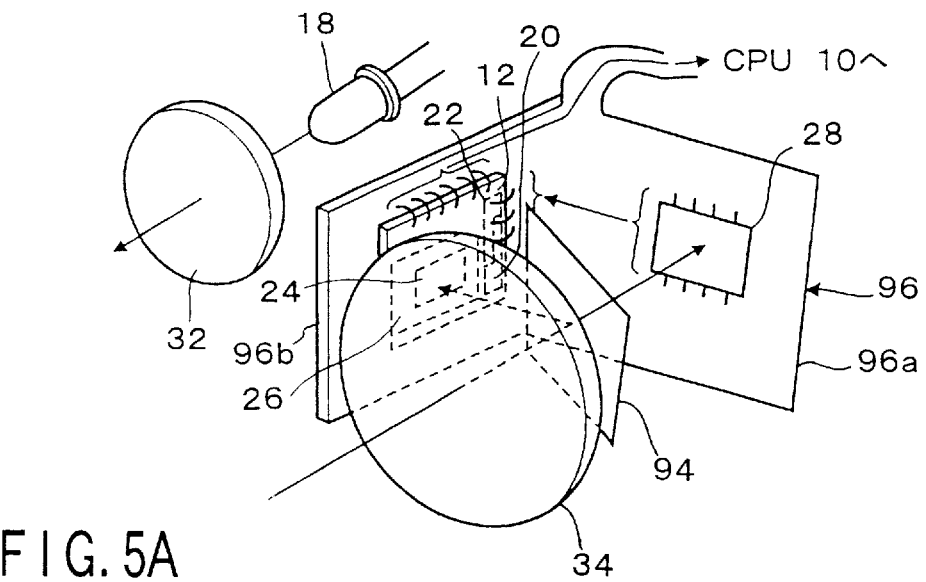
F I G. 5A
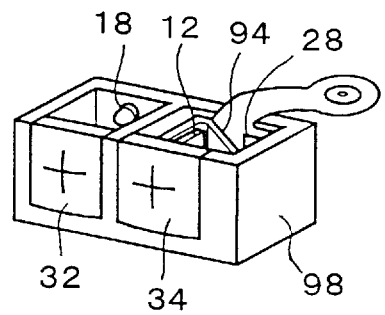
F I G. 5B
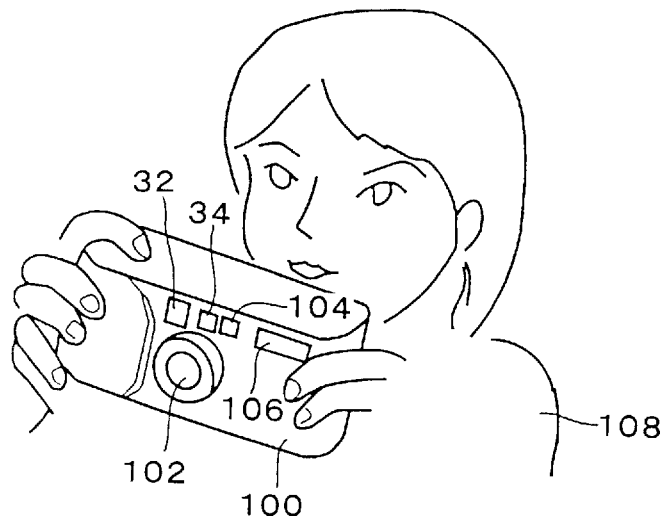
F I G. 5C

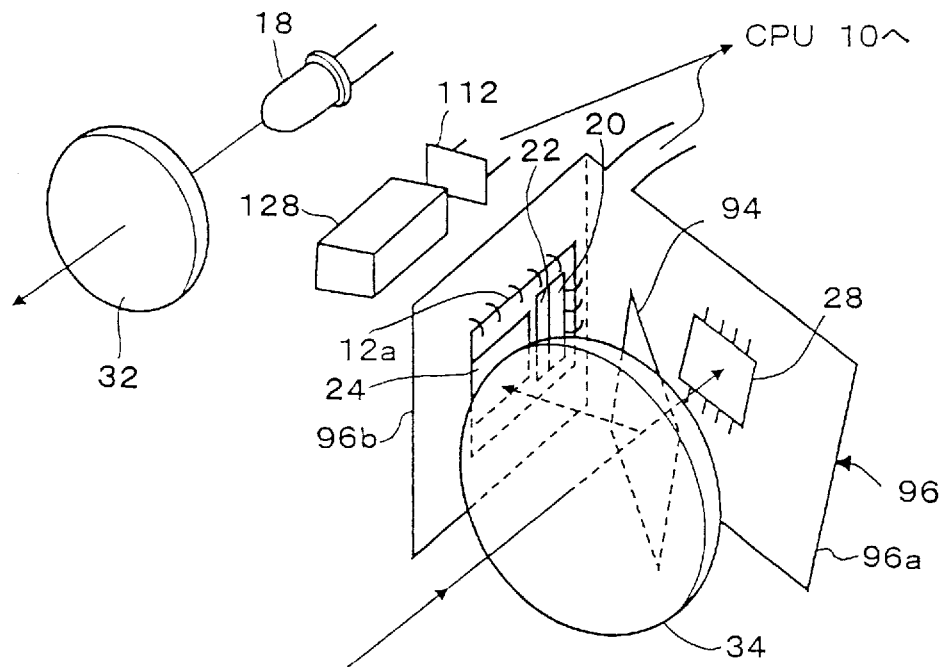
F I G. 9
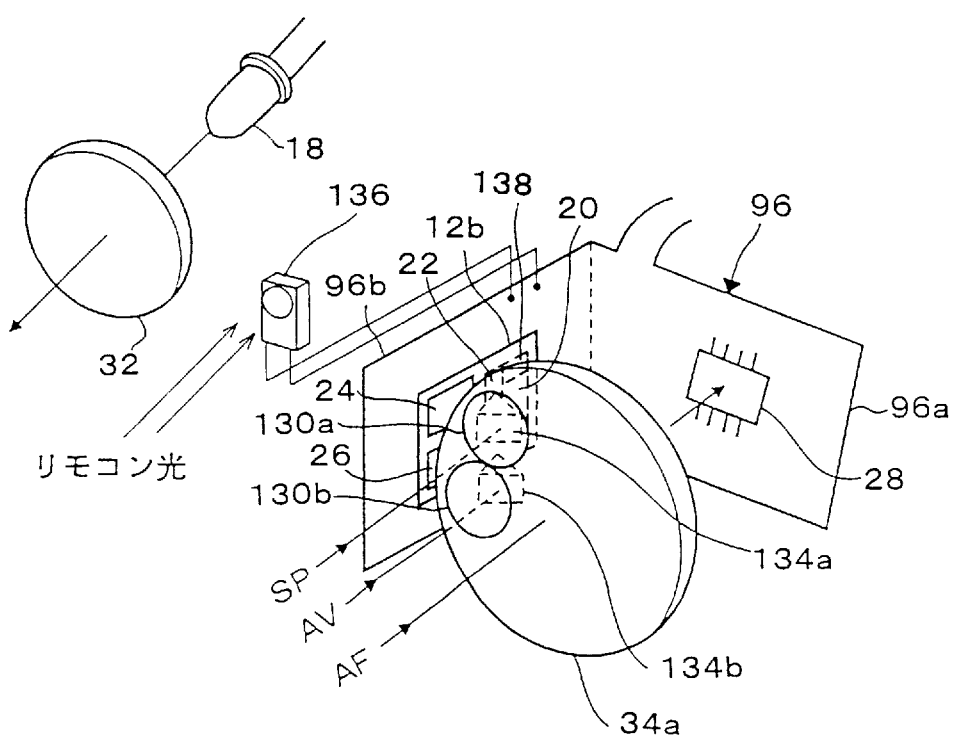
F I G. 10

PHOTOMETRY/DISTANCE MEASURING UNIT

CROSS-REFERENCE TO RELATED APPLICATIONS

This application is based upon and claims the benefit of priority from the prior Japanese Patent Application No. 11-157881, Jun. 4, 1999, the entire contents of which are incorporated herein by reference.

BACKGROUND OF THE INVENTION

The present invention relates to a photometry and distance measuring unit, and more particularly to a compact photometry and distance measuring unit which can reduce the influence of noises of a feeble-signal system.

A photometry and distance measuring unit detects feeble light from an object. The size of the unit depends on an arrangement of an optical system or an electrical element for the purpose of detection.

For example, it is known to arrange a photometry sensor between a light transmitting unit and a light receiving unit of an active AF (auto focus) device, as disclosed in Jpn. UM Appln. KOKAI Publication No. 6-18930. According to this arrangement, the space between light beams transmitted between the light transmitting unit and the light receiving unit can be effectively utilized.

In recent years, however, the equipment, such as cameras, has been more and more compact. Accordingly, the space between the light transmitting unit and the light receiving unit of an active AF device is reduced, or another member is interposed between the units. Thus, further space saving has been required.

Moreover, it is necessary to take into consideration that the photometry and distance measuring unit treats a feeble electrical signal.

BRIEF SUMMARY OF THE INVENTION

Accordingly, an object of the present invention is to provide a compact and high-performance photometry/distance measuring unit.

According to a first aspect of the present invention, there is provided a photometry/distance measuring unit having photometry and distance measuring functions, comprising:

a distance measuring photoelectric converting element; and a processing circuit formed on a chip independent of the distance measuring photoelectric converting element and including on one surface thereof a photometry photoelectric converting portion and a signal processing portion for processing an output from the distance measuring photoelectric converting element.

According to a second aspect of the present invention, there is provided a one-chip semiconductor element comprising:

(a) a photometry photoelectric converting element for outputting an electric signal in accordance with an amount of received light; and (b) a processing circuit for processing a signal detected outside the semiconductor element in order to detect a distance to an object.

According to a third aspect of the present invention, there is provided a camera having photometry and distance measuring functions, comprising:

a light projecting element for projecting distance measuring light to an object;

a first light receiving sensor for receiving the distance measuring light reflected by the object; and a one-chip semiconductor element including:

(a) a second light receiving sensor for receiving light from a predetermined region of a photographing area; and (b) a distance measuring circuit for calculation-processing an output signal from the first light receiving sensor.

According to a fourth aspect of the present invention, there is provided a distance measuring apparatus comprising:

a first chip including a distance measuring photoelectric converting element for receiving light passed through an optical system; and a second chip including a signal processing circuit for processing an output signal from the distance measuring photoelectric converting element, the second chip being arranged on a side of the optical system for guiding light to the first chip.

According to a fifth aspect of the present invention, there is provided a photodetecting apparatus for detecting light and performing a predetermined calculation process based on a result of detection, comprising:

a first chip including a first photosensor;

a second chip independent of the first chip, including:

(a) a second photosensor; and (b) a processing circuit for calculation-processing an output signal from the first photosensor.

According to a sixth aspect of the present invention, there is provided a camera having a distance measuring apparatus, the camera comprising:

a distance measuring light receiving element having a light receiving surface for receiving light from an object to detect a distance to the object, a light receiving position on the light receiving surface being varied in a predetermined direction in accordance with the distance to the object; and a processing circuit, arranged perpendicular to the predetermined direction in which the light receiving position on the light receiving surface is varied, for performing a predetermined process for detecting the distance to the object based on an output signal from the distance measuring light receiving element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5C show layouts of the unit according to the first embodiment; FIG. 5A is a perspective view showing a layout of components of the photometry and distance measuring unit, FIG. 5B is an external view of the unit, and FIG. 5C is an external view of a camera incorporating the photometry and distance measuring unit;

FIG. 9 is a diagram showing a layout of the unit according to the second embodiment;

FIG. 10 is a diagram showing a layout of the unit according to a third embodiment of the present invention;

FIG. 11A is a diagram showing the structure of a photo-receiving lens 34a;

DETAILED DESCRIPTION OF THE INVENTION

Embodiments of the present invention will be described with reference to the accompanying drawings.

Figure 1:
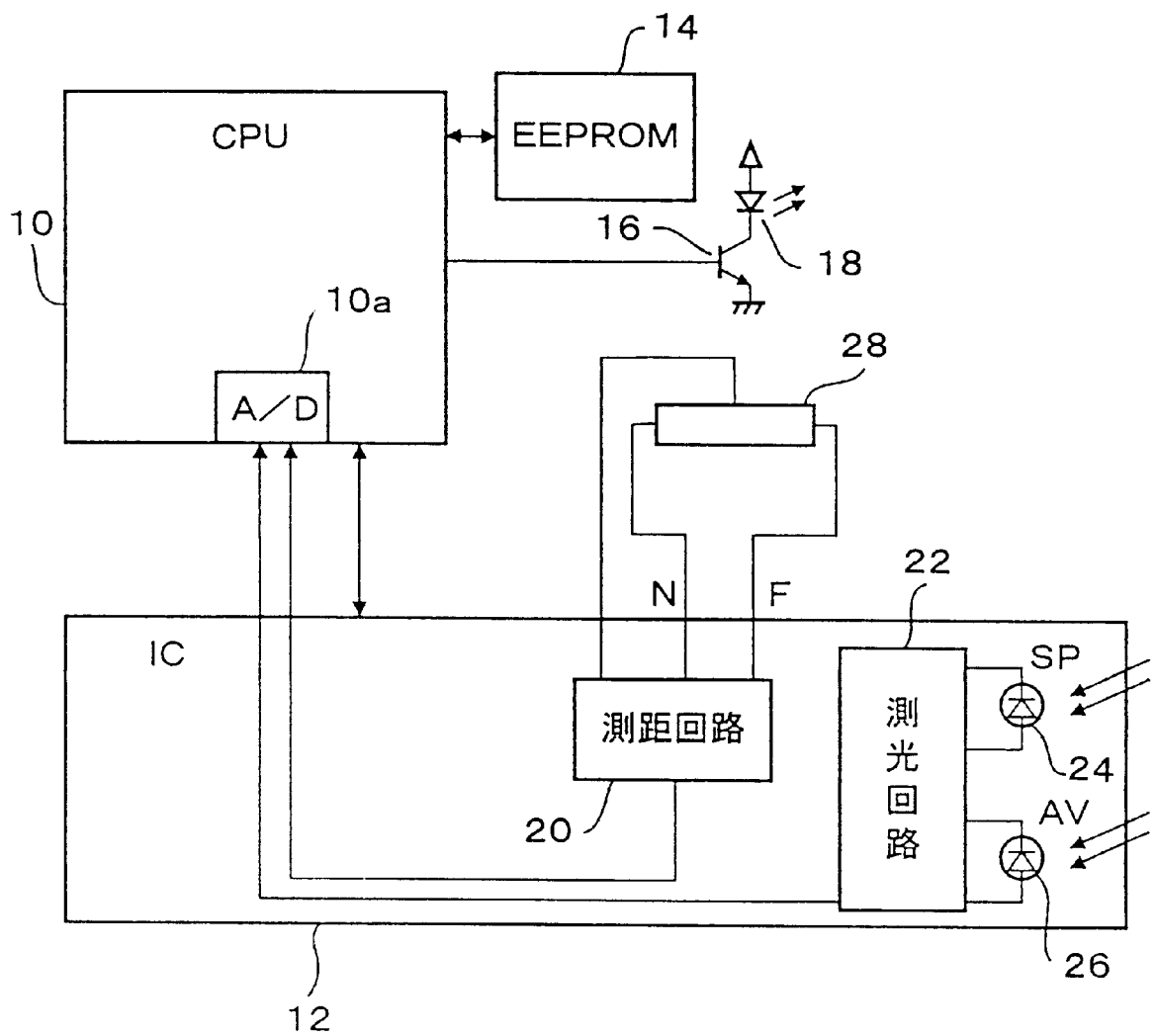
FIG. 1 is a circuit diagram showing an electric circuit of a photometry and distance measuring unit according to a first embodiment of the present invention.

FIG. 1 is a circuit diagram showing an electric circuit of a photometry and distance measuring unit according to a first embodiment of the present invention.

Referring to FIG. 1, a reference numeral 10 denotes a one-chip microcomputer (CPU), which includes an A/D converter 10a having a function of converting analog photometry data and distance measuring data output from an IC 12 to digital values.

The CPU 10 has digital input/output ports for carrying out communication with the IC 12. In addition, it can drive an EEPROM 14 so that data can be written therein and read therefrom. It can also drive an infrared light emission diode (IRED) 18 for transmitting light for active AF (auto focus) via a power transistor 16 serving as a driver.

The IC 12 is constituted by a processing IC including a distance measuring sensor and a photometry sensor. The IC includes a distance measuring circuit 20, a photometry circuit 22, and photodiodes constituting a photometry photoelectric converting section for carrying out photometry. The photodiodes include a spot sensor 24 for photometry of a central portion of an area to be photographed and an averaging metering sensor 26 for photometry of the other portion.

The distance measuring circuit 20 receives an output from an external distance measuring photoelectric converting element PSD (optical position sensing element or position sensitive diode) 28, and outputs a distance measuring value (e.g., an analog voltage value) to the CPU 10. Likewise, the photometry circuit 22 receives outputs from the spot sensor 24 and the averaging metering sensor 26, and outputs an analog voltage value to the CPU 10.

The EEPROM 14 stores data for correcting individual-to-individual variations of photometry and distance measuring values.

Figure 2:
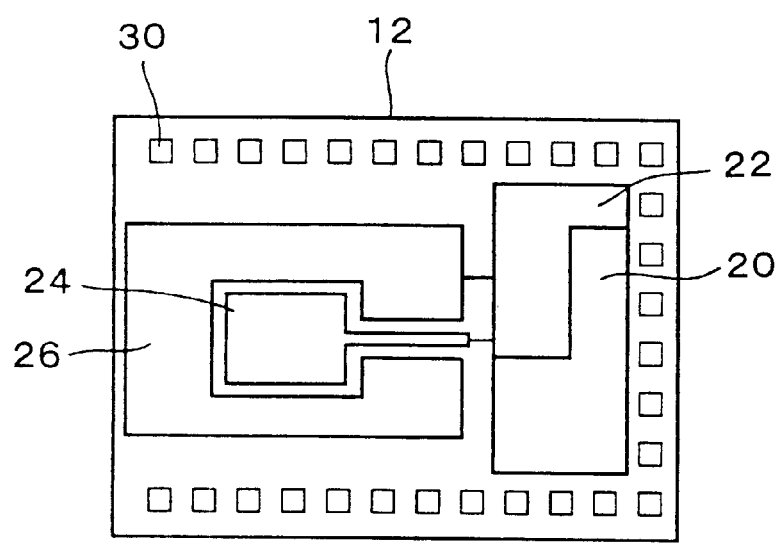
FIG. 2 is a diagram showing the internal structure of the IC 12 of the first embodiment.

FIG. 2 is a diagram showing the internal structure of the IC 12 of the first embodiment.

As shown in FIG. 2, the photometry sensors, i.e., the spot sensor 24 and the averaging metering sensor 26, are mounted on a left portion of the chip of the IC 12. On a right portion of the chip, the distance measuring circuit 20 and the photometry circuit 22 are mounted.

A plurality of pads 30 are arranged on the three sides of the chip except for the side on which the aforementioned sensors (SPD: silicon photo diodes) are located. The portion of the chip where the distance measuring circuit 20 and the photometry circuit 22 are located is covered by a light-shielding member (not shown) so that it may not malfunction due to exposure.

Figure 3:
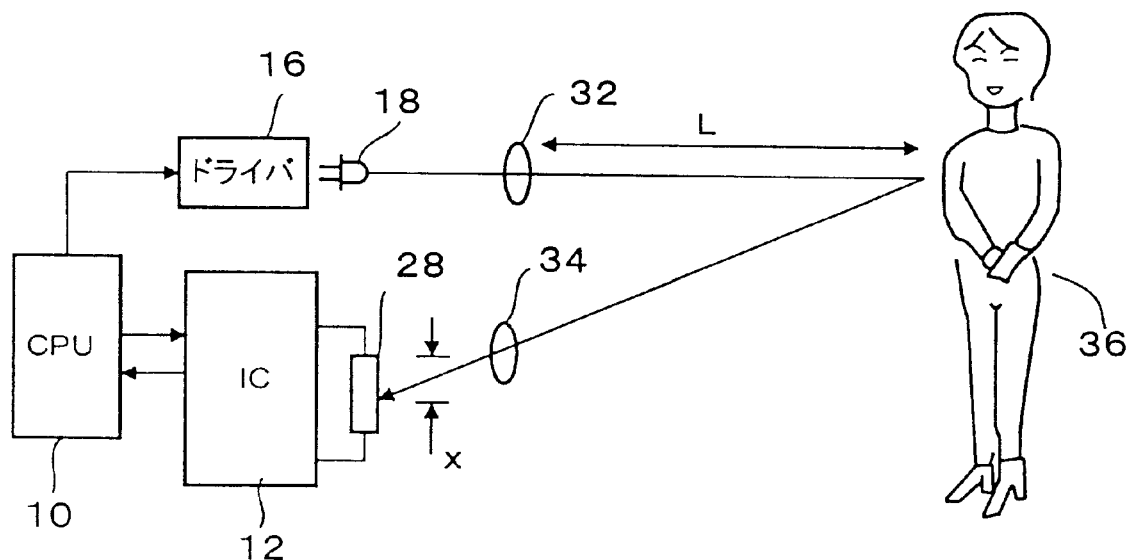
FIG. 3 is a diagram for explaining a triangular distance measuring apparatus.

As shown in FIG. 3, a light transmitting lens 32 and a light receiving lens 34 are respectively located in front of the IRED 18 and the PSD 28, thereby forming a triangular distance measuring apparatus in which the distance between the light transmitting and light receiving lenses is the base line length. The reflection light incidence position x of the PSD 28 is varied in accordance with the distance L to an object 36. Therefore, the distance L to the object 36 can be measured by detecting the reflection light incidence position.

Figure 4:
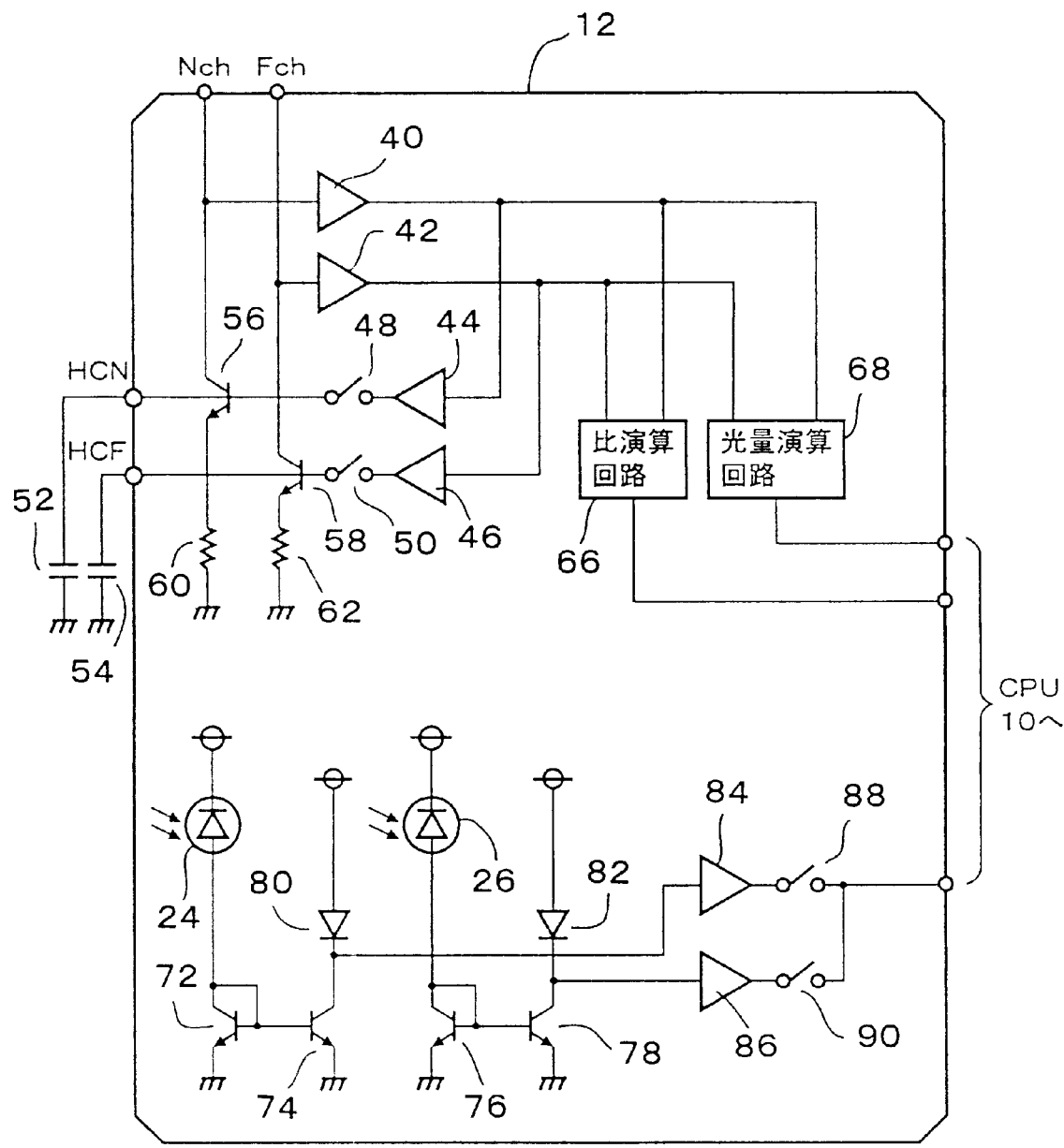
FIG. 4 is a circuit diagram showing the structures of the distance measuring circuit 20 and the photometry circuit 22 of the first embodiment.

FIG. 4 is a circuit diagram showing the structures of the distance measuring circuit 20 and the photometry circuit 22.

Referring to FIG. 4, head amplifiers 40 and 42 respectively amplify a photocurrent from a short-distance side current terminal (N ch) of the PSD 28 and a photocurrent from a long-distance side current terminal (F ch). Hold amplifiers 44 and 46 connected to the outputs of the head amplifiers 40 and 42 charge/discharge a current into/from hold capacitors 52 and 54 outside the IC 12 via switching elements 48 and 50, thereby regulating the levels of stationary light extraction of NPN transistors 56 and 58.

Emitter resistors 60 and 62 for suppressing the gains of the NPN transistors 56 and 58 are connected between the ground and the emitters of the NPN transistors 56 and 58.

The outputs of the head amplifiers 40 and 42 are connected to both a ratio calculating circuit 66 and a light quantity calculating circuit 68. The ratio calculating circuit 66 detects a ratio of photocurrents flowing from the PSD 28, while the IRED 18 is emitting light, from which photocurrents the stationary components have been removed. The light quantity calculating circuit 68 calculates the sum of the photocurrents flowing through the two channels. Outputs from the ratio calculating circuit 66 and the light quantity calculating circuit 68 are converted to analog voltages, which are output to the CPU 10.

The IC 12 includes the photometry photodiodes 24 and 26 formed on the same chip of the IC, as described before. The photocurrents generated by the photodiodes 24 and 26 are turned by current mirrors respectively constituted by a pair of NPN transistors 72 and 74 and a pair of NPN transistors 76 and 78, and logarithmically compressed by diodes 80 and 82. The logarithmically compressed signals are caused to have low impedance by means of buffers 84 and 86, selected by switching elements 88 and 90 and output to the outside of the IC 12.

FIGS. 5A to 5C show layouts of the unit according to the first embodiment.

FIG. 5A is a perspective view showing a layout of components of the photometry and distance measuring unit.

Referring to FIG. 5A, the light transmitting lens 32 is located in front of the IRED 18 so that it can converge a light beam from the IRED 18. The light receiving lens 34 converges a light beam for the PSD 28 and the photodiodes 24 and 26 on the IC 12 (not shown in FIGS. 5A to 5C).

A half mirror 94 is located between the light receiving lens 34 and the PSD 28. The half mirror 94 is inserted in order to split the light passed through the light receiving lens 34 into the two directions toward the PSD 28 and the IC 12.

The PSD 28 and the IC 12 are contained on a print circuit board 96. The PSD 28, encapsulated in a package integral with a visible light cutting filter, is mounted on a first circuit board portion 96a of the print circuit board 96. The IC 12 in a chip state is adhered to a second circuit board portion 96b of the print circuit board 96 in a bare chip state wherein the pads are wire-bonded. A connecting terminal is extended from the IC 12 and connected to a port of the CPU (not shown).

The first circuit board portion 96a of the print circuit board 96, on which the PSD 28 is mounted, is perpendicular to the optical axis of the received light. The IC 12 is mounted on a surface substantially perpendicular to the surface on which the PSD is mounted. Further, the second circuit board portion 96b is arranged between the light receiving lens 34 and the light transmitting lens 36 in proximity to the PSD 28.

The second circuit board portion 96b of the print circuit board 96, on which the IC 12 is mounted, is made of an opaque member. It is extended to a side of the light transmitting lens 32. Therefore, deleterious light (stray light) of the infrared light can be prevented from being incident on the PSD 28 without using a special light-shielding member.

FIG. 5B is an external view of the unit, and FIG. 5C is an external view of a camera incorporating the photometry and distance measuring unit.

The components arranged as shown in FIG. 5A are loaded into a unit portion 98 as shown in FIG. 5B. The unit portion 98 loaded with the components is incorporated into a camera 100.

A photographing lens 102 is mounted on a front portion of the camera 100. The light transmitting lens 32, the light receiving lens 34 and a finder 104 are arranged side by side and mounted also on the front portion of the camera 100 above the photographing lens 102. A strobe light emitting section 106 is arranged next to the finder 104. The user grasps the camera 100 having the structure described above to take a photograph.

According to the first embodiment described above, the following advantages can be obtained.

Since the PSD 28, i.e., the distance measuring photoelectric converting element, is independent of the processing circuit, the process can be most suitable for the PSD. As a result, the PSD can have high photoelectric converting efficiency.

In addition, since the photodiodes, i.e., the photometry photoelectric converting elements, the photometry circuit and the distance measuring circuit are formed on the one chip, the mount space can be small. Moreover, since a photometry system signal is completed within the chip, an influence of noise is little and the accuracy is high.

Further, since the light receiving lens 34 for distance measuring is also used for photometry, the space can be saved.

Furthermore, since the IC 12 is located near the PSD 28 and substantially perpendicular to the PSD 28, the space along the base line length direction can be small.

Furthermore, since the distance measuring circuit 20 of the IC 12 is arranged on the side of the PSD 28, the wiring area can be small, with the result that noises of distance measuring will not be easily superposed.

Since the surface of the print circuit board 96 on which the IC 12 is mounted is opaque and extends to the side of the light receiving lens 34, infrared from the light transmitting side can be easily cut.

A second embodiment of the present invention will now be described.

The second embodiment of the present invention is similar to the first embodiment described above, but different therefrom in that only a sensor (photodiode) for photometry of a central portion is provided on the IC 12 and an averaging metering sensor is provided on another element, and also in that the sensor for photometry of the central portion can remove stationary light and integrate the quantity of light by utilizing a part of the distance measuring circuit.

Therefore, the same elements as those of the first embodiments are identified by the same reference numerals and descriptions thereof will be omitted.

Figure 6:
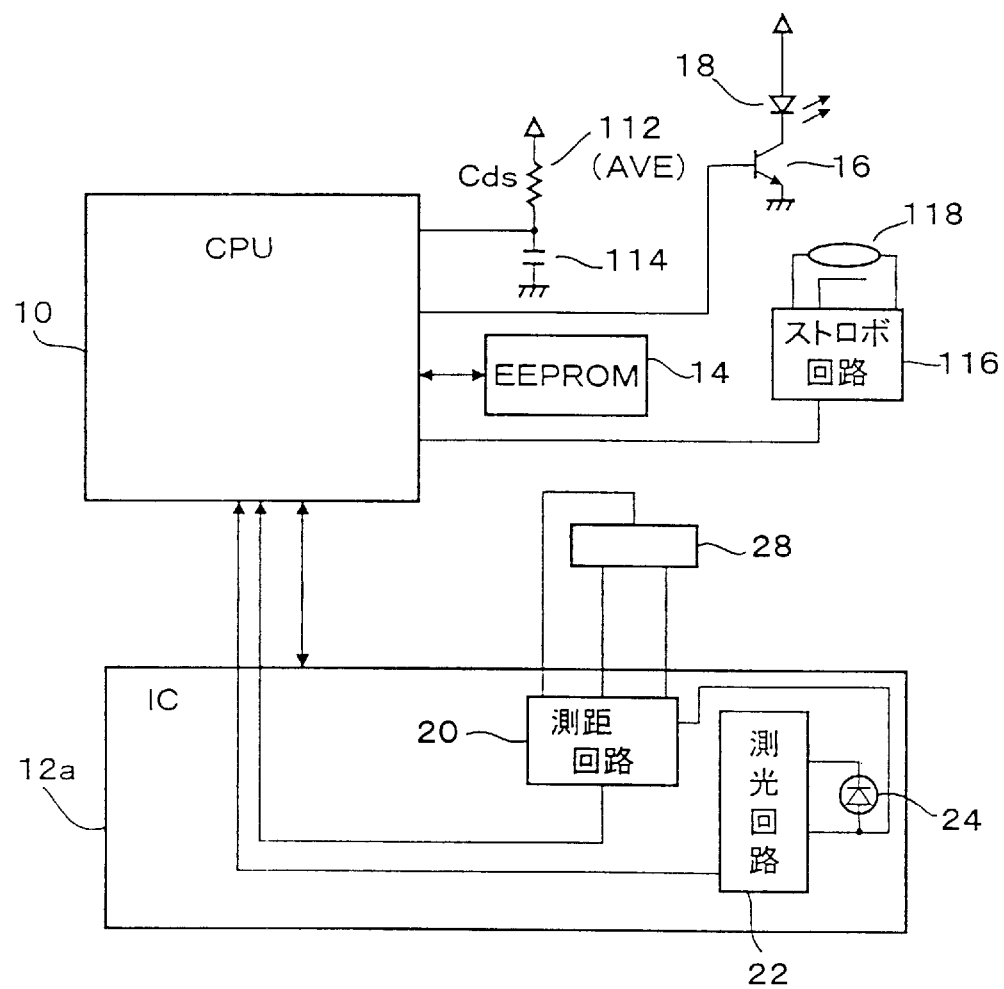
FIG. 6 is a circuit diagram showing an electric circuit of a photometry and distance measuring unit according to a second embodiment of the present invention.

FIG. 6 is a circuit diagram showing an electric circuit of a photometry and distance measuring unit according to the second embodiment.

In FIG. 6, a port of the CPU 10 is connected to an end of an averaging metering sensor (Cds) 112 and an end of a capacitor 114. The other ends of the sensor 11 and the capacitor 114 are respectively connected to a terminal Vcc and the ground GND. The CPU 10 is also connected to a stroboscopic circuit 116 which is operated in accordance with instructions from the CPU 10, and to a xenon (Xe) tube 118 via the stroboscopic circuit 116.

An IC 12a, connected to the CPU 10, includes a distance measuring circuit 20 connected to a PSD 28, and a photometry circuit 22 connected to a spot sensor 24.

Figure 7:
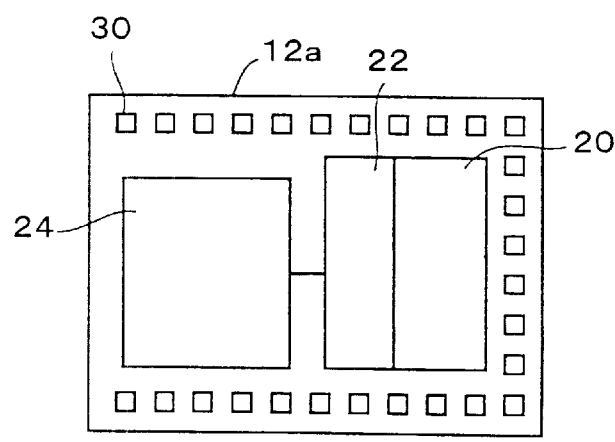
FIG. 7 is a diagram showing the internal structure of the IC 12a of the second embodiment.

FIG. 7 is a diagram showing the internal structure of the IC 12a of the second embodiment.

As shown in FIG. 7, the photodiode (SPD) 24 for photometry of the central portion is mounted on a left portion of the chip of the IC 12a. On a right portion of the chip of the IC 12a, the distance measuring circuit 20 and the photometry circuit 22 are mounted.

Figure 8:
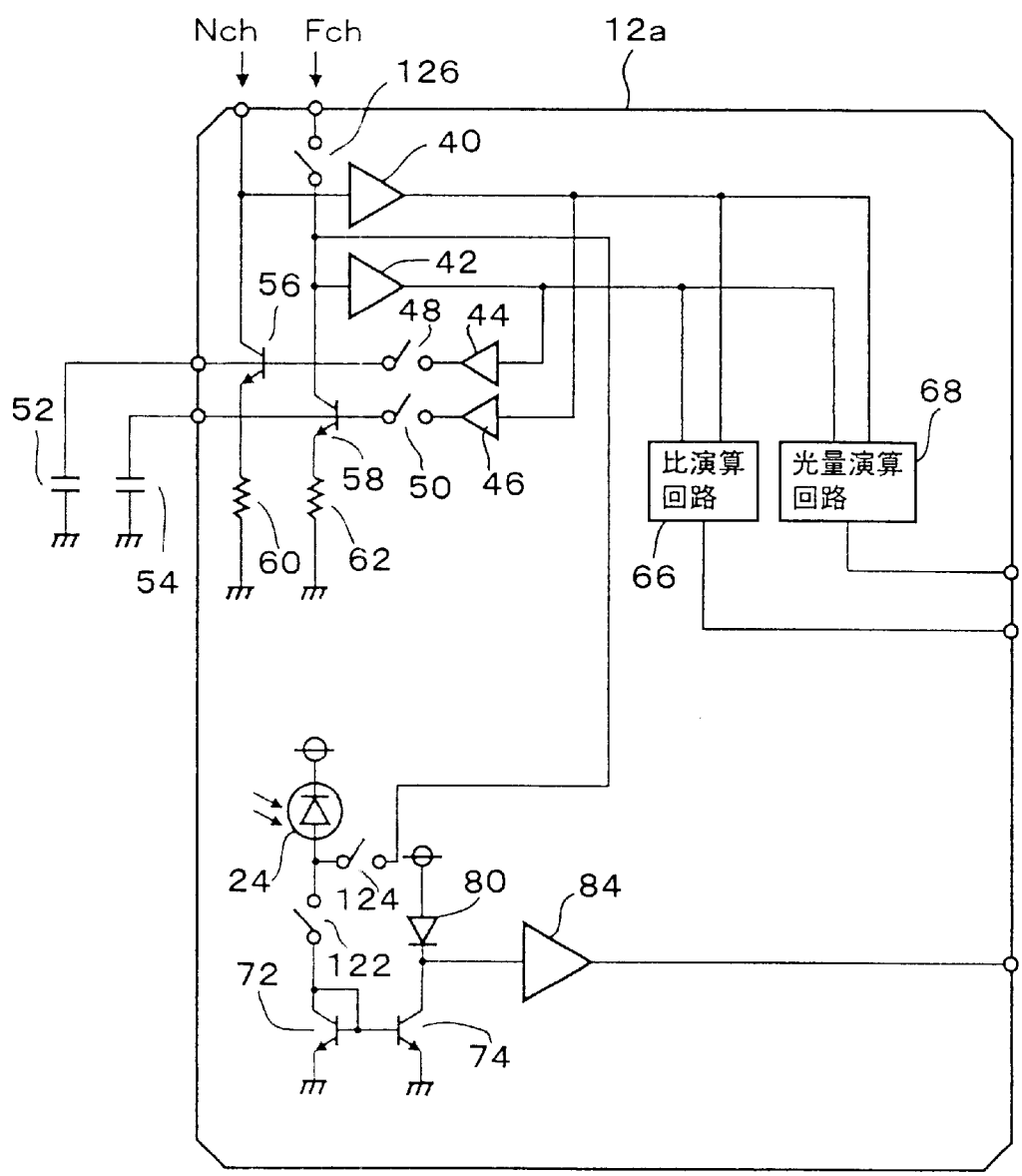
FIG. 8 is a circuit diagram showing the structures of the distance measuring circuit 20 and the photometry circuit 22 of the second embodiment.

FIG. 8 is a circuit diagram showing the structures of the distance measuring circuit 20 and the photometry circuit 22.

In FIG. 8, an output of the photodiode 28 is generally connected to a switching element 122 to perform photometry. When the switching element 122 is opened, a switching element 124 is closed, and a switching element 126 is opened, removal of stationary light and integration of the quantity of light can be carried out by means of a photocurrent of the photodiode 24.

For example, a long distance which cannot be detected by the distance measuring circuit by means of emission of strobe light can be measured based on the quantity of light. In addition, after the distance is detected by the distance measuring circuit, the reflectivity of the object can be measured also by the strobe light. Thus, the measurement can be applied to exposure correction.

FIG. 9 is a diagram showing a layout of the unit according to the second embodiment.

In FIG. 9, the average metering sensor 112 is arranged so as to measure the light passed through a tunnel 128 for shielding the portion of light outside the range of the photometry. In this case, the light is measured depending on with what delay a signal at the port connecting end of the capacitor 114, which has been discharged through the port, is inverted when the port is switched to the input side.

According to the second embodiment, the following advantages can be obtained.

Since only the central portion photometry sensor (spot sensor portion), having a small area, is formed on the IC chip, the area of the IC chip can be reduced. In addition, the range of photometry is narrow in the central portion, and the photocurrent is less. Since the section of the narrower range is formed on the chip, the influence of noises or the like can be reduced. Thus, spot photometry can be performed accurately and backlight can be determined.

When the field of view of the light receiving lens for photometry is adjusted to the PSD 28, the angle of view only covers the central portion, which coincides with the spot photometry area. Therefore, the focal length of the light receiving lens 34 need not be reduced and the distance measuring accuracy can be easily improved.

Further, the photometry sensor can carry out integration of the quantity of light, and long-distance measurement and determination of the reflectivity by means of strobe light. In addition, since it uses a part of the distance measuring circuit, it can be realized using substantially no additional components or elements.

A third embodiment of the present invention will now be described.

The third embodiment is similar to the first embodiment but different in the structure of the light receiving lens, the arrangement of the photometry photodiodes on the IC 12, etc.

FIG. 10 is a diagram showing a layout of the unit according to a third embodiment of the present invention.

Figure 11A:
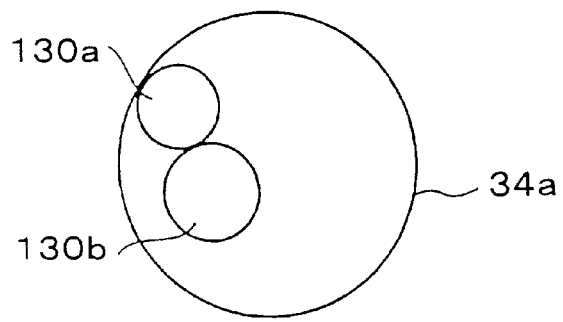

In FIG. 10, a light receiving lens 34*a* comprises portions having different curvatures. As shown in FIG. 11A, lens portions 130*a* and 130*b* are formed in the light receiving lens 34*a*. The lens portions 130*a* and 130*b* have angles of view respectively corresponding to areas for spot photometry and average metering.

Figure 11B:
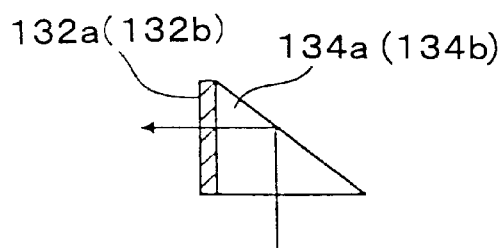
FIG. 11B is a diagram showing the structure of a total reflection prism.

As shown in FIG. 11B, total reflection prisms 134*a* and 134*b*, with infrared cutting filters 132*a* and 132*b* adhered to light emitting surfaces thereof, are located behind the lens portions 130*a* and 130*b*.

Further, a remote control sensor 136 is inserted in a space between light transmitting and light receiving systems. A signal from the remote control sensor 136 is processed by an IC 12*b* and an output from the IC 12*b* is transmitted to a CPU 10 by means of communication.

Figure 12:
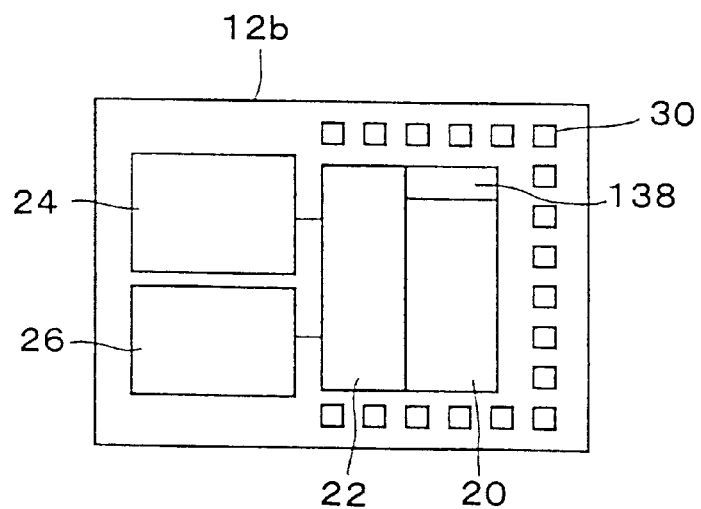
FIG. 12 is a diagram showing the internal structure of the IC 12b of the third embodiment.

The IC 12*b* comprises two photodiodes. As shown in FIG. 12, the two photodiodes 24 and 26, both rectangular, are mounted on a left portion of the chip of the IC 12*b*. On a right portion of the IC 12*b*, a distance measuring circuit 20, a photometry circuit 22 and a remote control detecting circuit 138 are mounted.

As described above, according to the third embodiment, a light receiving lens having focal lengths suitable for distance measuring, spot photometry and average metering is constituted by one member. Therefore, it can be compact and inexpensive.

In addition, the photodiodes on the IC 12*b* are simple in shape, and the positions thereof can be freely set. Therefore, the layout efficiency is high.

Further, since the remote control sensor 136 is located in a space between the light transmitting system and the light receiving system for distance measuring, the space efficiency is high. Furthermore, the chip of the IC 12*b* includes the photoelectric converting section for photometry, the distance measuring signal processing circuit, the photometry signal processing circuit and the remote control sensor output processing circuit. Therefore, the feeble-signal system can be processed by a compact device at a low cost.

Moreover, since the infrared cutting filters can be fixed to planes of the prisms, the filter setting is easy.

In the third embodiment, the areas for spot photometry and average metering on the light receiving lens may be separated from each other (for example, at the upper end and the lower end) and need not be circular. The total reflection surfaces of the prisms may be either flat or curved. If the surfaces are curved, the curvatures of the lenses may be constant and the focal lengths may be corrected at the reflection at the prisms.

Integration of the quantity of light in the photometry sensor may be carried out by means of an LED, a lamp instead of strobe light. Apart from the object of the present invention, the touch of a finger on the strobe button may be detected.

In the first to third embodiments as described above, the distance measuring output is not necessarily a voltage. Instead, the charge/discharge time of a capacitor may be output as a digital signal.

Further, the photometry portion may be divided into three or more. The distance measuring point need not be one but may be a plurality of points (multiple AF system).

Furthermore, the IC may be a CMOS process IC or Bi-CMOS process IC other than a bipolar process IC.

As described above, according to the present invention, the chip can be used in common optimally. As a result, the characteristics of the devices can be optimized, so that a compact and high-performance photometry/distance measuring unit can be provided.

Further, the present invention can provide a compact and high-performance photometry/distance measuring unit, in which the component devices are arranged efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photometry/distance measuring unit having photometry and distance measuring functions, comprising:

a distance measuring photoelectric converting element; and a processing circuit formed on a chip independent of the distance measuring photoelectric converting element and including on one surface thereof a photometry photoelectric converting portion and a signal processing portion for processing an output from the distance measuring photoelectric converting element.

2. A unit according to claim 1, further comprising a light projecting element for projecting distance measuring light, wherein:

the unit measures a distance by a method in which light reflected from an object resulting from the distance measuring light is received by the distance measuring photoelectric converting element; and the processing circuit is located between the distance measuring photoelectric converting element and the light projecting element.

3. A unit according to claim 2, wherein the processing circuit is mounted on a printed circuit board, and the printed circuit board also serves as stray light shielding means for preventing stray light generated by the light projecting element from reaching the distance measuring photoelectric converting element.

4. A unit according to claim 1, further comprising a remote control sensor for receiving a remote control signal, wherein the processing circuit includes a portion for processing an output signal of the remote control sensor.

5. A one-chip semiconductor element comprising:
   (a) a photometry photoelectric converting element for outputting an electric signal in accordance with an amount of received light; and
   (b) a processing circuit for processing a signal detected outside the semiconductor element in order to detect a distance to an object.

6. A camera having photometry and distance measuring functions, comprising:
   a light projecting element for projecting distance measuring light to an object;
   a first light receiving sensor for receiving the distance measuring light reflected by the object; and
   a one-chip semiconductor element including:
      (a) a second light receiving sensor for receiving light from a predetermined region of a photographing area; and
      (b) a distance measuring circuit for calculation-processing an output signal from the first light receiving sensor.

7. A camera according to claim 6, wherein the one-chip semiconductor element further includes:
   (c) a photometry circuit for calculation-processing an output signal from the second light receiving sensor.

8. A camera according to claim 6, wherein the first light receiving sensor and the one-chip semiconductor element are arranged perpendicular to each other.

9. A camera according to claim 8, wherein the one-chip semiconductor element is interposed between the light projecting element and the first light receiving sensor.

10. A camera according to claim 6, wherein the second light receiving sensor comprises a plurality of sensor portions for respectively receiving light beams from different regions.

11. A camera according to claim 6, wherein:
   the first light receiving sensor is an optical position sensing element having, at its both ends, a plurality of output portions for outputting a photocurrent in accordance with a light receiving position; and
   the distance measuring circuit includes at least one of a ratio calculating circuit for detecting a ratio of photocurrents output from said plurality of outputting portions of the optical position sensing element when the light projecting element projects light and a light quantity calculating circuit for calculating a sum of the photocurrents output from said plurality of outputting portions.

12. A camera according to claim 6, further comprising a third light receiving sensor, provided outside the one-chip semiconductor element, for receiving light from a region other than that received by the second light receiving sensor.

13. A camera according to claim 6, further comprising a signal receiving sensor for receiving a signal from an external remote control apparatus, wherein the one-chip semiconductor element further includes:
   (d) a remote control signal detecting circuit for processing an output signal from the signal receiving sensor.

14. A camera according to claim 13, wherein the signal from the external remote control apparatus is an optical signal.

15. A distance measuring apparatus comprising:
   a first chip including a distance measuring photoelectric converting element for receiving light passed through an optical system; and
   a second chip including a signal processing circuit for processing an output signal from the distance measuring photoelectric converting element, the second chip being arranged on a side of the optical system for guiding light to the first chip.

16. A distance measuring apparatus according to claim 15, further comprising light projecting means for projecting light to be incident on the first chip, wherein the second chip is arranged between the light projecting means and the first chip and parallel to an optical axis of the optical system.

17. A photodetecting apparatus for detecting light and performing a predetermined calculation process based on a result of detection, comprising:
   a first chip including a first photosensor;
   a second chip independent of the first chip, including:
      (a) a second photosensor; and
      (b) a processing circuit for calculation-processing an output signal from the first photosensor.

18. A photodetecting apparatus according to claim 17, wherein the first photosensor is a distance measuring photoelectric converting element which receives light for measuring a distance to an object.

19. A photodetecting apparatus according to claim 17, wherein the first photosensor is a remote controlling photoelectric converting element which receives signal light from an external remote control apparatus.

20. A camera having a distance measuring apparatus, said camera comprising:
   a distance measuring light receiving element having a light receiving surface for receiving light from an object to detect a distance to the object, a light receiving position on the light receiving surface being varied in a predetermined direction in accordance with the distance to the object; and
   a processing circuit, arranged perpendicular to the predetermined direction in which the light receiving position on the light receiving surface is varied, for performing a predetermined process for detecting the distance to the object based on an output signal from the distance measuring light receiving element.

* * * * *